(12) United States Patent
Hirabayashi

(10) Patent No.: US 9,366,214 B2
(45) Date of Patent: Jun. 14, 2016

(54) STARTER PROVIDED WITH ELECTROMAGNETIC SOLENOID INTEGRATING RUSH CURRENT SUPPRESSION FUNCTION

(71) Applicant: DENSO CORPORATION, Kariya, Aichi-pref. (JP)

(72) Inventor: Takashi Hirabayashi, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 285 days.

(21) Appl. No.: 14/257,495

(22) Filed: Apr. 21, 2014

(65) Prior Publication Data

US 2014/0311436 A1 Oct. 23, 2014

(30) Foreign Application Priority Data

Apr. 23, 2013 (JP) ................................. 2013-090279

(51) Int. Cl.
| | |
|---|---|
| H01H 50/54 | (2006.01) |
| H01H 50/02 | (2006.01) |
| F02N 11/00 | (2006.01) |
| F02N 11/08 | (2006.01) |
| F02N 15/06 | (2006.01) |
| H01H 51/06 | (2006.01) |

(52) U.S. Cl.
CPC .............. *F02N 11/00* (2013.01); *F02N 11/087* (2013.01); *F02N 11/0851* (2013.01); *F02N 15/067* (2013.01); *H01H 50/543* (2013.01); *H01H 51/065* (2013.01)

(58) Field of Classification Search
CPC ..... H01H 50/04; H01H 50/045; H01H 50/54; H01H 50/543; H01H 50/546; H01H 50/18; F02N 11/08; F02N 2250/02; F02N 11/087; F02N 11/0859; F02N 2300/106

USPC .................................................... 123/179.25
See application file for complete search history.

(56) References Cited

U.S. PATENT DOCUMENTS

| | | | | | |
|---|---|---|---|---|---|
| 3,465,353 | A | * | 9/1969 | Buxton | ............... F02N 11/0851 |
| | | | | | 123/179.25 |
| 3,743,931 | A | * | 7/1973 | Brodhacker | ............ F02N 11/00 |
| | | | | | 340/517 |
| 4,551,630 | A | * | 11/1985 | Stahura | ............... F02N 11/0851 |
| | | | | | 123/179.3 |
| 5,525,947 | A | * | 6/1996 | Shiga | ................... F02N 11/0851 |
| | | | | | 335/126 |
| 6,104,157 | A | * | 8/2000 | Kramer | ............... F02N 11/0851 |
| | | | | | 318/430 |
| 6,938,599 | B2 | * | 9/2005 | Senda | .................... F02N 11/087 |
| | | | | | 123/179.3 |
| 7,038,564 | B1 | * | 5/2006 | Kusumoto | ............ F02N 15/062 |
| | | | | | 335/126 |

(Continued)

FOREIGN PATENT DOCUMENTS

| | | |
|---|---|---|
| JP | A-2011-142067 | 7/2011 |
| JP | 2014-214625 A | 11/2014 |

*Primary Examiner* — Hai Huynh
*Assistant Examiner* — Raza Najmuddin
(74) *Attorney, Agent, or Firm* — Oliff PLC

(57) ABSTRACT

An electromagnetic solenoid that controls a motor current of a starter includes: a first switch including a pair of first fixed contacts and a first movable contact, intermitting the motor current; a suppression resistor that suppresses the motor current; a second switch including a pair of second fixed contacts and a second movable contact, making a short circuit path to bypass the suppression resistor; a regulation member being driven by a sub solenoid, regulating the second switch being closed and releasing the second switch from being regulated after predetermined time elapses when a plunger is pulled by a main electromagnet. The regulation member is disposed between a regulated position and a released position to regulate the second switch.

16 Claims, 11 Drawing Sheets

(56) References Cited

U.S. PATENT DOCUMENTS

| | | | | |
|---|---|---|---|---|
| 7,973,623 B2* | 7/2011 | Andoh | F02N 11/087 123/179.3 |
| 8,011,902 B2* | 9/2011 | Nagase | F02D 41/065 318/244 |
| 8,513,825 B2* | 8/2013 | Suzuki | F02N 11/087 290/38 R |
| 8,899,204 B2* | 12/2014 | Hattori | F02N 11/0862 123/179.25 |
| 9,070,518 B2* | 6/2015 | Neet | H01H 3/28 |
| 9,076,620 B2* | 7/2015 | Lee | H01H 50/305 |
| 2004/0017086 A1* | 1/2004 | Shiga | F02N 11/0851 290/38 R |
| 2008/0162007 A1* | 7/2008 | Ishii | F02N 11/0855 701/54 |
| 2009/0206965 A1* | 8/2009 | Niimi | H01H 50/54 335/106 |
| 2009/0231070 A1* | 9/2009 | Saruwatari | H01H 50/04 335/179 |
| 2010/0033276 A1* | 2/2010 | Niimi | H01H 50/30 335/202 |
| 2010/0251852 A1* | 10/2010 | Murata | F02N 11/0844 74/7 A |
| 2010/0264765 A1* | 10/2010 | Haruno | F02N 11/087 310/71 |
| 2011/0140813 A1 | 6/2011 | Suzuki et al. | |
| 2011/0198862 A1* | 8/2011 | Yamada | F02N 11/087 290/38 R |
| 2011/0221210 A1* | 9/2011 | Suzuki | F02N 11/087 290/38 R |
| 2012/0032453 A1* | 2/2012 | Nakamura | F02N 11/087 290/38 R |
| 2012/0162847 A1* | 6/2012 | Suzuki | F02N 11/087 361/206 |
| 2012/0242431 A1* | 9/2012 | Nawa | H01H 3/001 335/185 |
| 2013/0027157 A1* | 1/2013 | Niimi | H01H 50/443 335/2 |
| 2013/0173144 A1* | 7/2013 | Bradfield | F02N 11/087 701/113 |
| 2013/0207750 A1* | 8/2013 | Daitoku | H01H 50/00 335/126 |
| 2014/0311434 A1 | 10/2014 | Hirabayashi | |
| 2015/0097375 A1* | 4/2015 | Qin | F02N 11/0851 290/38 A |

* cited by examiner (IV – IV)

(V – V)

STARTER PROVIDED WITH ELECTROMAGNETIC SOLENOID INTEGRATING RUSH CURRENT SUPPRESSION FUNCTION

CROSS-REFERENCE TO RELATED APPLICATION

This application is based on and claims the benefit of priority from earlier Japanese Patent Application No. 2013-90279 filed Apr. 23, 2013, the description of which is incorporated herein by reference.

BACKGROUND

1. Technical Field

The present disclosure relates to a starter to start an engine mounted on a vehicle, and more particularly to a starter provided with an electromagnetic solenoid unit integrating a function in which rush current is suppressed when the motor of the starter is activated.

2. Description of the Related Art

Recently, to reduce carbon dioxide emissions and enhance fuel efficiency, vehicles provided with an idle stop system (hereinafter referred to ISS) that automatically stops and restarts the engine have been increased. Since vehicles having ISS stop the engine every time when the vehicles have to stop at the intersection due to red traffic lights or due to a traffic jam and restart the engine in response to a restart request, the frequency of the engine start operation is significantly increased.

In this respect, a problem arises that a large amount of current (referred to as starting current or rush current) flows when the motor is activated in response to the engine restart request after the idle stop operation is performed. Specifically, when the large amount of current flows, the terminal voltage of the battery is greatly decreased so that instantaneous power failure occurs thereby causing momentary stop of the electric equipment such as meters, audio equipment or navigation system. Generally, since the vehicle provided with the ISS performs the idle stop on the road, a large amount of current flows every time when the starter operates so that the driver may be stressed significantly from this phenomena.

To avoid occurrence of the instantaneous power failure, suppression resistor is employed. For example, Japanese Patent Application Laid-Open Publication No. 2011-142067 discloses a technique in which an electromagnetic relay (referred to as ICR (In-rush current reduction) relay) that integrates a suppression resistor is connected to an activation circuit of the motor and a low resistive circuit path and a high resistive circuit path are controlled to be switched therebetween in response to the relay contact being ON and OFF. This ICR relay forms high resistive circuit path including the suppression resistor when the ICR relay is opened (turned OFF) in response to activation of the motor. As a result, suppressed current flows into the motor from the battery through the suppression resistor, whereby significant voltage drop at the terminal of the battery can be avoided. Subsequently, when the relay contact is closed (turned ON), both ends of the suppression resistor are short-circuited to form the low resistive circuit path, whereby the whole battery voltage is applied to the motor.

However, since the ICR relay conventionally used is an individual component, it is necessary to prepare a signal line in order to operate the ICR relay and a harness to connect the ICR relay and the starter, so that necessary man-hours and the number of components are increased, thereby increasing the system cost. Further, the ICR relay and the starter are connected by an additional harness whereby wiring resistance increases due to the additional harness. As a result, since the output power of the starter is decreased, depending on types of vehicles, it is necessary to use a starter having large enough output power compared to conventionally used starters.

Furthermore, since a fixing portion to fix the ICR relay is required to be disposed in the starter housing or other portion in the vehicle side, depending on types of vehicles, there is a difficulty to dispose the fixing portion in the vehicle. When the ICR relay is required to be disposed at battery side with respect to the B terminal (i.e., a bolt-shape connection terminal to which the harness is connected) of the electromagnetic switch, voltage is always applied to the connection terminal of the ICR relay which is connected to the activation circuit. Therefore, to avoid unnecessary short circuit caused by a foreign body or a tool contacting the connection terminal of the ICR relay, a protection cover is necessary to cover the connection terminal. As a result, necessary man-hours and the number of components are further increased so that the system cost will be increased.

The embodiment provides a starter provided with a small-size/light-weight electromagnetic solenoid unit that integrates a conventional ICR relay function (function capable of suppressing rush current).

SUMMARY

The embodiment provides a starter provided with a small-size/light-weight electromagnetic solenoid unit that is adapted to an idle stop function and that integrates an in-rush current suppression function.

As an aspect of the embodiment, a starter according to the present disclosure includes:

a motor that generates rotational force by being energized, the motor rotating about a rotational axis thereof;

a pinion that transmits the rotational force of the motor to a ring gear of the engine when the pinion engages with the ring gear; and an electromagnetic solenoid fixed to a starter housing to be in parallel with the motor such that the rotational axis of the motor and an axial direction being a longitudinal direction of the electromagnetic solenoid are parallel.

The electromagnetic solenoid includes:

a pair of first fixed contacts disposed at an activation circuit of the motor;

a first movable contact facing the pair of first fixed contacts, being movable in the axial direction to open and close the pair of first fixed contacts, the pair of first fixed contacts being closed when the first movable contact contacts with the pair of first fixed contacts and the first fixed contacts being opened when the first movable contact is separated from the pair of first fixed contacts;

a first switch that intermittently cuts off a current supplied to the motor in response to the first movable contact opening and closing the pair of first fixed contacts, the first switch being opened when the first movable contact opens the pair of first fixed contacts and being closed when the first movable contact closes the pair of first fixed contacts;

a suppression resistor connected to the activation circuit to be in series to the first switch, suppressing rush current flowing into the activation circuit when the first switch is closed;

a pair of second fixed contacts disposed at the activation circuit, bypassing the suppression resistor;

a second movable contact facing the pair of second fixed contacts, being movable in the axial direction to open and close the pair of second fixed contacts, the pair of second fixed contacts being closed when the second movable contact contacts with the pair of second fixed contacts and the pair of second fixed contacts being opened when the second movable contact is separated from the pair of second fixed contacts;

a second switch that short-circuits the suppression resistor to make a short circuit path when the second movable contact closes the pair of second fixed contacts, the second switch releasing the short circuit path when the second movable contact opens the pair of second fixed contacts, the second switch being opened when the second movable contact opens the pair of second fixed contacts and being closed when the second movable contact closes the pair of second fixed contacts;

a main solenoid including a main electromagnet when being energized and a plunger being pulled by the main electromagnet to move in the axial direction, wherein the main solenoid pushes the pinion out towards the ring gear in response to the plunger moving in the axial direction and drives the first movable contact and the second movable contact towards the pair of first fixed contacts and the pair of second fixed contacts respectively;

a regulation member disposed to be movable between a regulated position and a released position, the regulated position regulating movement of the second movable contact not to contact with the pair of second fixed contact when the second switch is being closed, the released position releasing movement of the second movable contact so as to allow the second movable contact to contact with the pair of second fixed contact; and a sub solenoid forming a sub electromagnet when being energized, driving the regulation member to be at the regulated position when the sub electromagnet is ON and releasing the regulation member to be at the released position when the sub electromagnet is OFF.

The sub solenoid is configured to control the sub electromagnet to be ON and OFF such that the regulation member is driven to be at the regulated position before the second switch is closed when the main solenoid starts to operate, so as to regulate the movement of the second movable contact and the regulation member is released to be at the released position when a predetermined time elapses after the plunger is pulled by the main electromagnet, so as to release the movement of the second movable contact.

The electromagnetic solenoid according to the present disclosure regulates the movement of the second movable contact by operating the sub solenoid before the second switch is closed in response to an activation of the main solenoid, whereby the high resistive circuit path including the suppression resistor at the activation circuit of the motor can be formed. Thus, when the first switch is closed, the current flows through the suppression resistor so as to supply suppressed current to the motor. As a result, significant voltage drop of the battery voltage can be avoided. Moreover, since the operating time of the sub solenoid (i.e., corresponding to a period from when the regulation member is driven to be at the regulated position and to when the regulation member is released to be at the released position) is small, e.g., more than approx. 10 millisecond and up to approx. 200 milliseconds, heat generated by the sub solenoid being energized can be significantly reduced. Also, when the regulation member is driven to be at the regulated position thereby regulating the movement of the second movable contact, a movement of the plunger itself of the main solenoid is not regulated. Therefore, regulation force of the sub solenoid required for regulating the second movable contact does not necessarily exceed the force of the main electromagnetic solenoid being applied to the plunger 33, whereby the sub solenoid can be shrunk.

Further, while the sub solenoid is operating, that is, while the movement of the second movable contact is regulated by the regulating member, the second movable contact and the second fixed contact have not been contacted with each other. Hence, when the first switch is closed, since the current is supplied to the motor via the suppression resistor from the battery, significant voltage drop of the battery voltage due to rush current does not occur. In other words, the electromagnetic unit according to the present disclosure has a function serving a ICR relay conventionally used. As a result, influence of the voltage drop due to rush current is small so that the sub solenoid can be further shrunk. The sub solenoid has a configuration in which the plunger is pushed out when the second electromagnet is formed so as to drive the regulation member is driven to be at the regulated position. Accordingly, if a fault occurs in the sub solenoid, that is, the sub solenoid does not work even when power is supplied, the regulation member is not driven to be at the regulated position. In this case, the electromagnet solenoid can be operated as similarly to that of the non-ISS switch. Hence, even when a fault occurs in the sub solenoid, the fault does not immediately cause a malfunction of the starter operation. As a result, robustness of the electromagnetic solenoid can be enhanced.

Furthermore, the starter according to the present disclosure, since a function of the conventional ICR relay is integrated to the electromagnet solenoid, a harness that connects the starter and the ICR relay is not necessary, so that voltage drop at the harness (resistor-loss of the harness) becomes zero. As a result, compared to a case where the ICR relay and the starter are combined, the output capability of the starter can be enhanced. Also, the number of components is reduced so that system cost can be reduced and no areas for an ICR relay to be mounted are necessary so that the mountability of the starter is improved.

DETAILED DESCRIPTION OF THE PREFERRED EMBODIMENTS

The embodiments of the present disclosure are now described in detail as follows.

First Embodiment

With reference to FIGS. 1 to 13, hereinafter is described the first embodiment.

Figure 1:
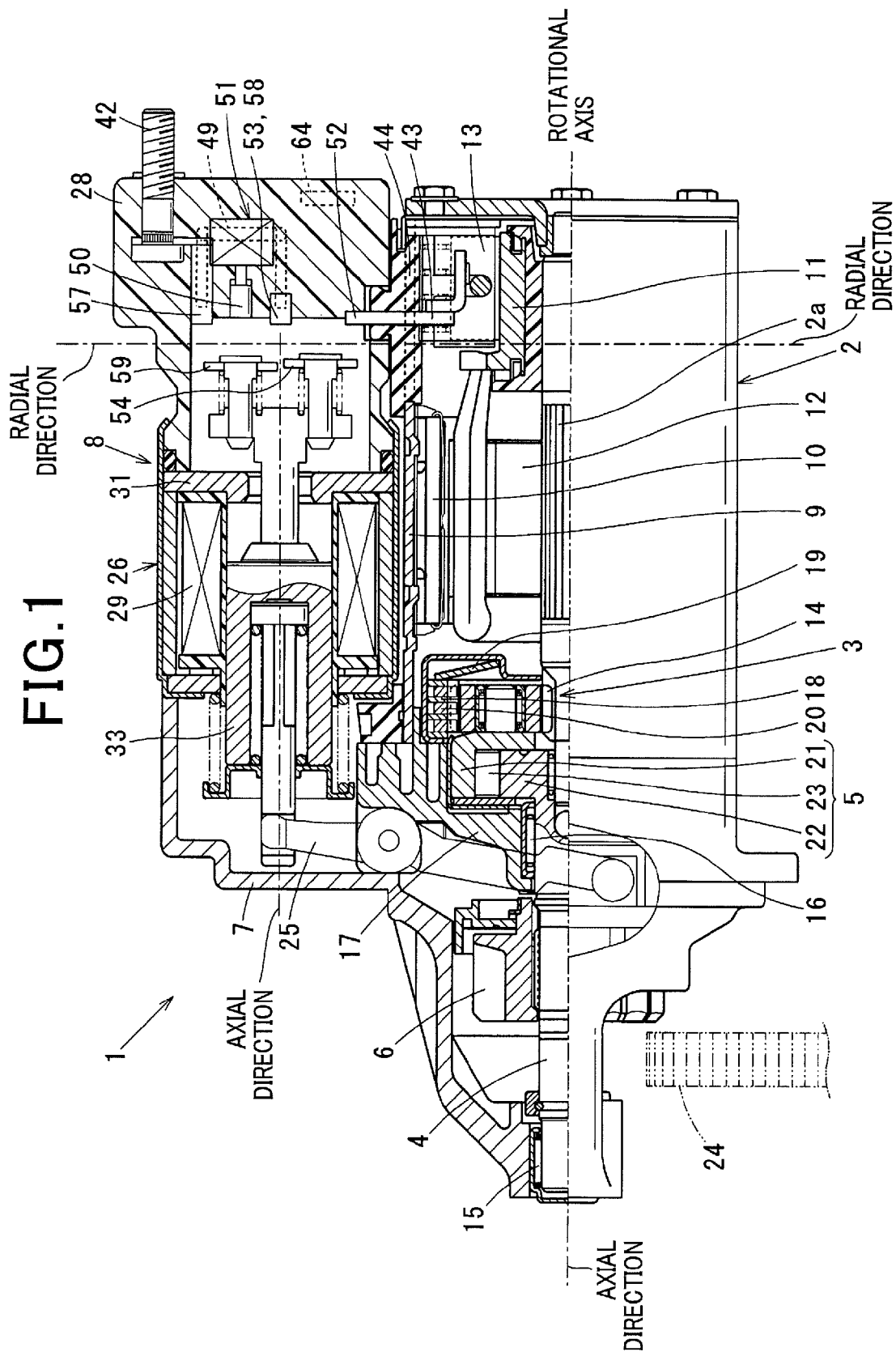
FIG. 1 is a diagram showing a half cross-section of the starter according to the embodiments of the present disclosure.

As shown in FIG. 1, the starter 1 according to the first embodiment includes a commutator motor 2 that generates rotational force by being energized, a reduction unit 3 that reduces the rotational speed of the motor 2, an output shaft 4 coupled to an armature shaft 2a of the motor 2, an impact absorber (described later) that absorbs excessive impact propagated from the engine side, a clutch 5 that transmits torque generated by the motor 2 and amplified by the reduction unit 3 to the output shaft 4, a pinion 6 disposed on the output shaft 4 and an electromagnetic solenoid unit 8 fixed to a starter housing 7 together with the motor 2. The motor 2 and the electromagnetic solenoid unit 8 are fixed to the starter housing 7 to be in parallel to each other such that the rotational axis of (armature shaft 2a) the motor 2 and the longitudinal direction (axial direction) of the electromagnetic solenoid unit 8 are parallel. The motor 2 includes a field element constituted by a plurality of permanent magnet 10 disposed on the inner periphery of a yoke 9 that forms magnetic circuit, an armature 12 provided with a commutator 11 at the end portion of the anti-reduction unit side (right side in FIG. 1) of the armature shaft 2a and a brush 13 disposed on the outer periphery of the commutator 11. As shown in FIG. 1, a permanent magneto type field element is shown, however, electromagnetic type field element can be employed.

The reduction unit 3 is a well known planetary gear type reduction unit in which a plurality of planetary gears rotate around an own axis and revolve around the sun gear by receiving rotation of the armature shaft 2a. The output shaft 4 is disposed on the axis extended from the one of the armature shaft 2a of the motor 2 (same axis: the axis direction is indicated by a dotted line in FIG. 1), and one end portion of the output shaft 4 is rotatably supported by the starter housing 7 via a bearing 15 and the other end portion thereof is rotatably supported by a center case 17 via a bearing 16. The impact absorber is constituted by a fix plate 18 (rotation is regulated) and a friction plate 20 to be disposed alternately in which a disc spring 19 pushes the friction plate 20 so as to engage with the fix plate 20. The impact absorber absorbs impact when excessive torque is applied from engine side. Specifically, the friction plate 20 slips (rotates) to resist friction force when excessive torque is applied from engine side so as to absorb the impact. It is noted that the friction plate 20 also serves as an internal gear of the reduction unit 3.

The clutch 5 includes an outer 21 that rotates by receiving revolving force of the planetary gear 14, an inner 22 disposed at inner periphery side of the outer 21 together with the output shaft 4 and a roller 23 that intermits transmission of the force between the outer 21 and the inner 22. The clutch 5 serves as a one way clutch unit where rotational torque is transmitted from the outer 21 to the inner 22 via the roller 23, and transmission of the torque between the inner 22 and the outer 21 is cutoff by idle rotation of the roller 23. The pinion 6 is movably disposed on the outer periphery of the output shaft 4 by a helical spline-engagement. When the engine is required to start, the pinion 6 is engaged with the ring gear 24 (as shown in FIG. 1) so as to transmits the rotational torque of the motor 2 which is amplified by the reduction unit 3 to the ring gear 24.

Figure 2:
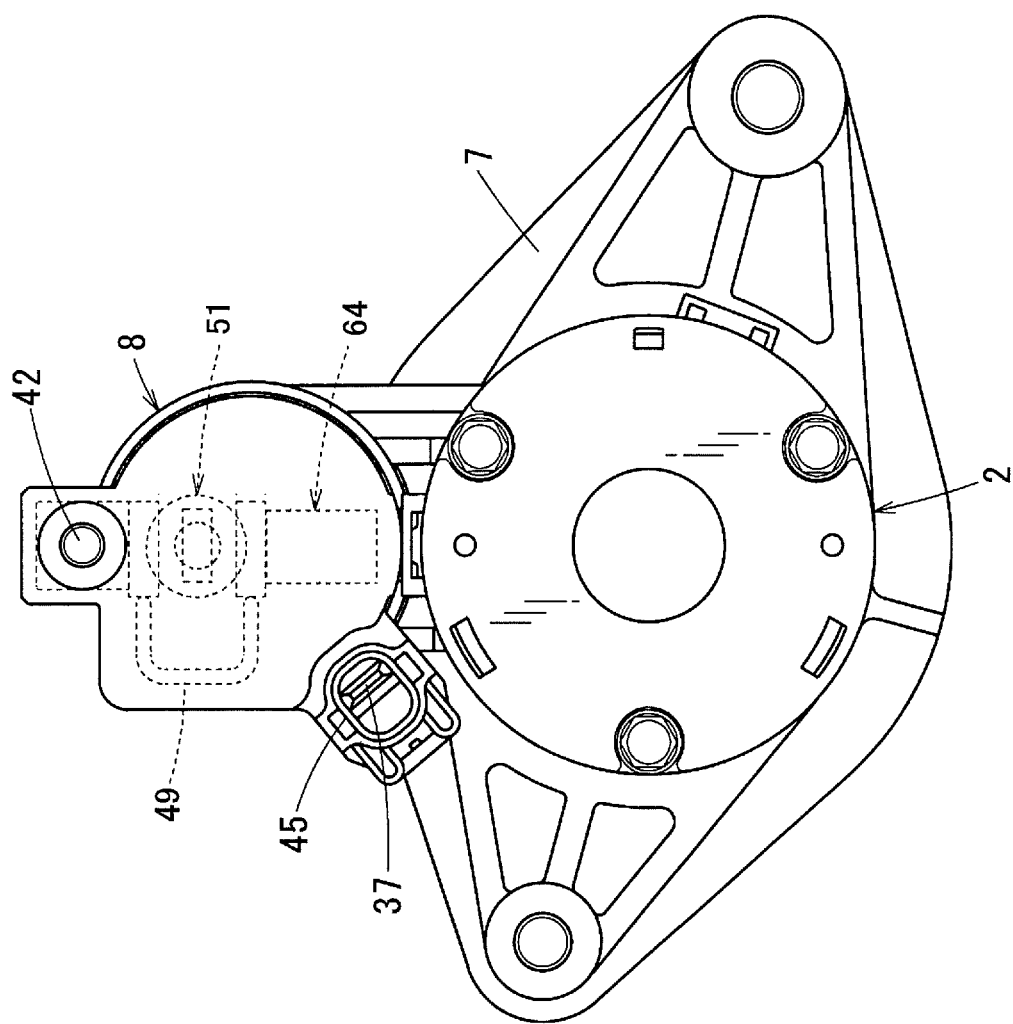
FIG. 2 is a diagram showing a rear view of the starter viewing from anti-pinion side with respect to the axial direction of the starter.
Figure 3:
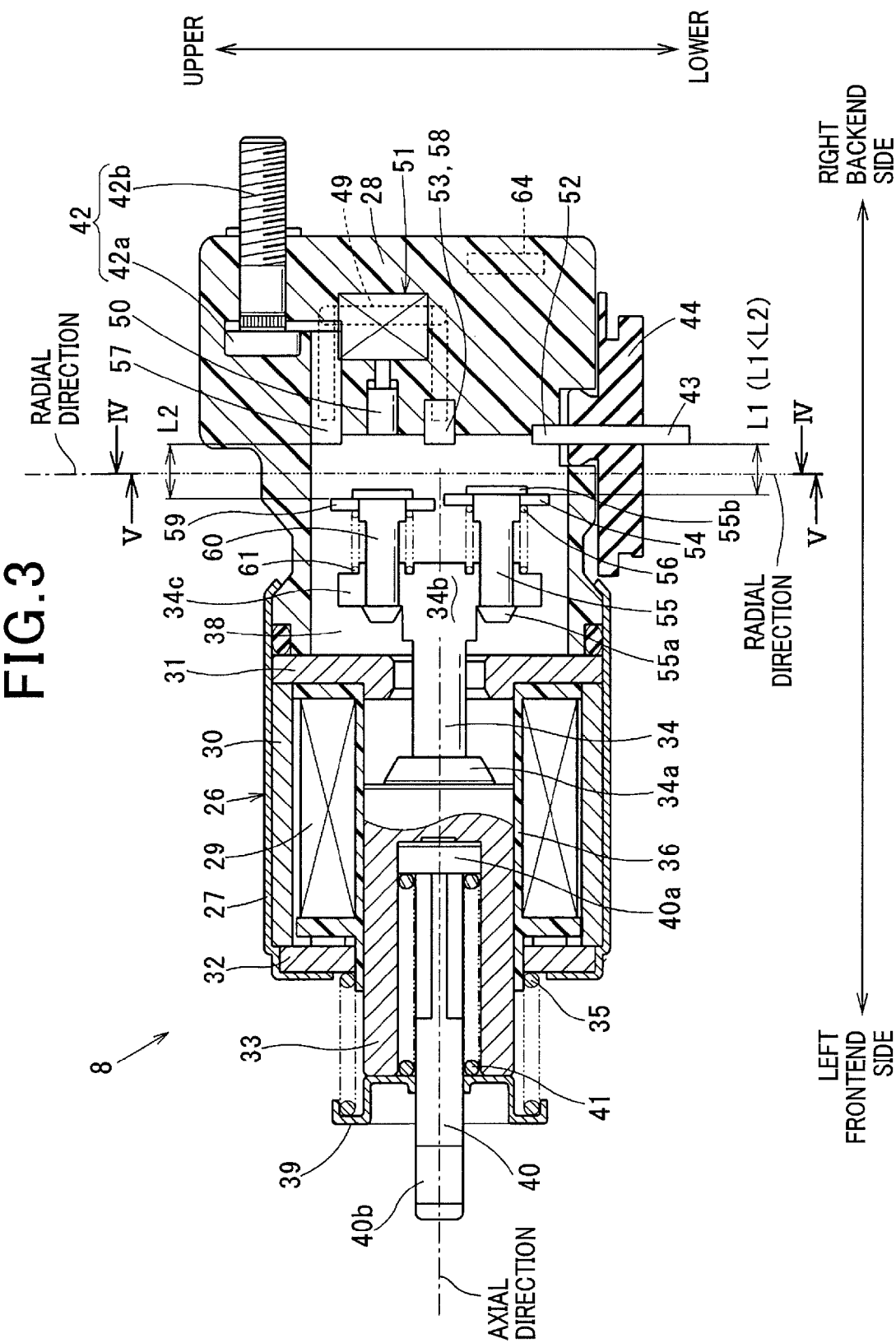
FIG. 3 is a diagram showing a cross-section of the electromagnetic solenoid unit.

Next, with reference to FIGS. 1 to 6, hereinafter is described a configuration of the electromagnetic solenoid unit 8. In the following description, the left side of the electromagnetic solenoid unit 8 as shown in FIG. 3 is defined as frontend side, and the right side thereof is defined as backend side. The longitudinal direction of the electromagnetic solenoid unit 8 is defined as the axial direction indicated by a dotted line in FIG. 3. The electromagnetic solenoid unit 8 is constituted by a main solenoid 26, a switch cover 28 and a contact unit (described later). The main solenoid 26 drives a shift lever 25 (FIG. 1) to push the pinion 6 out towards the ring gear 24 side. The switch cover 28 is fixed to a frame 27 so as to cover the opening of the frame 27. The frame 27 has a cylindrical shape and serving as a magnetic circuit of the main solenoid. The contact unit is disposed inside the switch cover 28. The main solenoid 26 includes a coil 29 that forms an electromagnet (hereinafter is referred to main electromagnet) by being energized, a cylindrical yoke disposed at the outer periphery of the coil 29, a fixed iron core 31 having circular shape disposed adjacent to the backend side of the coil 29, a fixed plate 32 having circular shape disposed adjacent to the frontend side of the coil 29, a plunger 33 that moves towards the axial direction in the inner periphery of the coil 29, a plunger rod 34 fixed to a backend face of the plunger 33 and a return spring 35 that urges the plunger 33 towards an anti-fixed iron core side (left side direction in FIG. 3).

Figure 6:
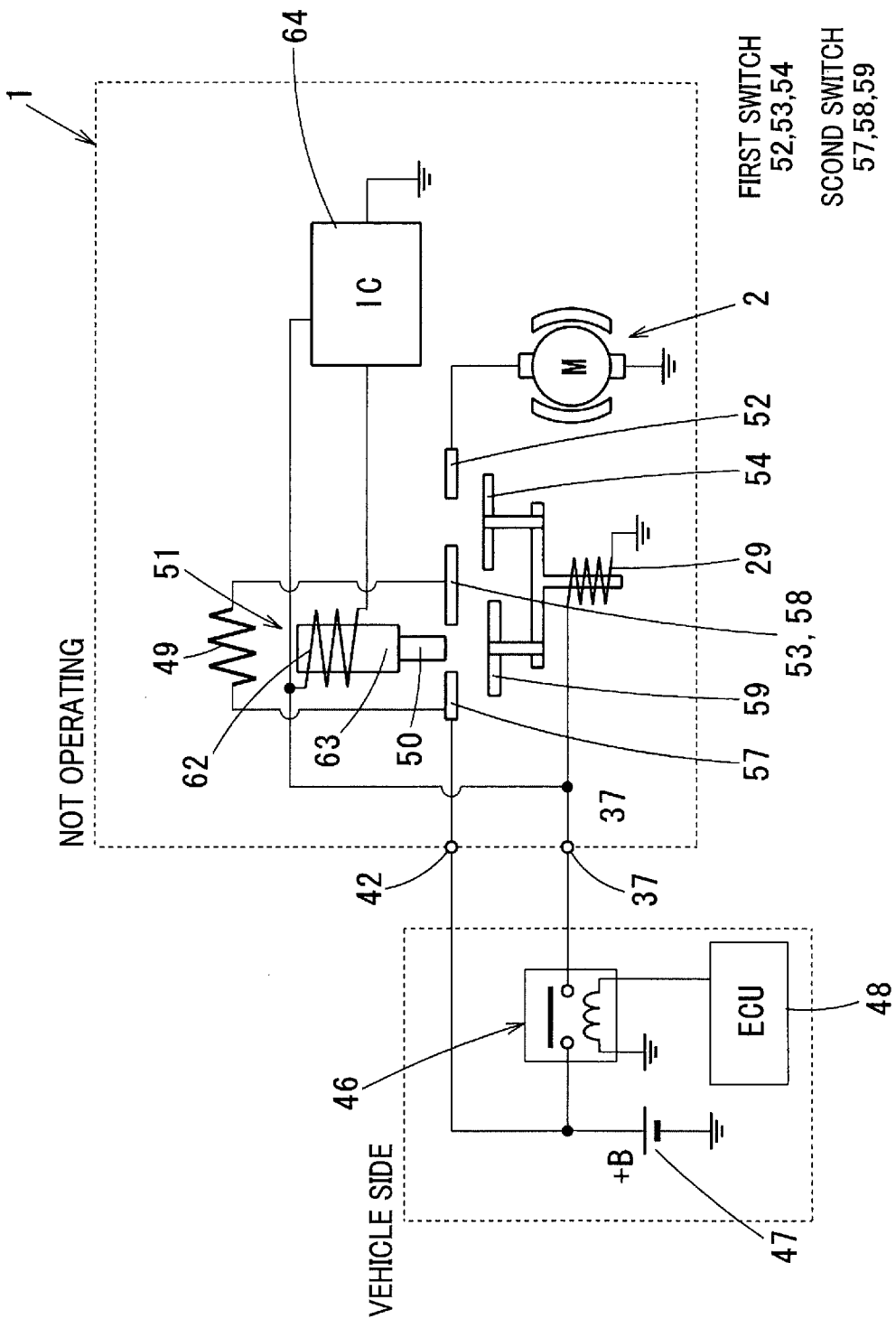
FIG. 6 is a circuit diagram of the starter.

The coil 29 is formed by being wound around the bobbin 36 which is made of resin. As shown in FIG. 6, one end portion of the coil 29 is connected to a conduction terminal (terminal-50 37 according to the first embodiment) and the other portion of the coil 29 is connected to, for example, the surface of the fixed iron core 31 to be grounded. Regarding the cylindrical yoke 30, the backend in the axial direction comes into contact with the fixed iron core 31 and the frontend in the axial direction comes into contact with the fixed plate 32 whereby a flux path is formed between the fixed iron core 31 and the fixed plate. The fixed iron core 31 is disposed such that an inner periphery side in the radial direction extends to be within the inner diameter of the bobbin 36 and faces the plunger 33 in the axial direction. The fixed plate 32 is formed by ferromagnetics such as iron as similar to that of the fixed iron core 31. The fixed plate 32 is magnetized when the main electromagnet is formed.

In the plunger 33, a cylindrical hole is formed in the inner periphery of the plunger 33 to have a bottomed cylindrical shape such that a bottomed surface is formed at the backend side of the cylindrical hole and an opening is formed at the frontend side of the cylindrical hole. Regarding the plunger rod 34, a flange portion 34a is disposed at the frontend side in the axial direction and the flange portion 34a is fixed to the end face of the plunger 33 by welding or bonding. The plunger rod 34 is extended in the axial direction through the inner periphery of the cylindrical hole being opened at the center portion of the fixed iron core and the end portion of anti-plunger side (backend side) extends to be in a contact point chamber 38 formed inside the switch cover 28. At the end portion of the anti-plunger side, a large rod portion 34b having larger rod diameter is disposed. Further, a holding disc 34c being extended in both radial directions (both upper/lower side in FIG. 3) of the large rod portion 34b is disposed together with the large rod portion 34b. Regarding the return spring 35, the backend in the axial direction thereof is supported by the anti-coil side end face and the frontend in the axial direction thereof is supported by a spring receiving portion 39 which is fixed to the frontend face of the plunger 33.

In the cylindrical hole formed at the plunger 33, a joint 40 that transmits a movement of the plunger 33 in the axial direction thereof to the shift lever 25 and a drive spring 41 disposed at outer periphery of the joint 40 are inserted to the cylindrical hole of the plunger 33. The joint 40 include a flange portion 40a disposed at the backend portion thereof. The flange portion 40a receives force of the drive spring 41 whereby the flange portion 40a is pushed to the bottom surface of the cylindrical hole. Moreover, an engaging groove 40b is formed at the frontend portion of the joint 40 protruded from the cylindrical hole of the plunger 33. By this engaging groove 40b, the end portion of the shift lever 25 is engaged with the engaging groove 40b in a forked shape (FIG. 1). The drive spring 41 is compressed while the plunger 33 is pulled by the fixed iron core 31 being magnetized with the main electromagnet so as to hold reaction force used for pushing the pinion 6 out towards the ring gear 24.

In the switch cover 28, two connection terminals including a first connection terminal 42 and a second connection terminal 43 which are connected to the activation circuit of the motor 2 and the above-described terminal-50 37 are disposed. The first connection terminal 42 corresponds to B terminal 42 to which a battery-harness is connected and the second connection terminal 43 corresponds to M terminal connected to the motor 2. As shown in FIG. 3, the B terminal 42 has a bolt-shape having a bolt head 42a and a male screw portion 42b in which the bolt head 42a is embedded to the switch cover 28 and the male screw portion 42b is protruded in the axial direction from the backend portion of the switch cover 28.

The M terminal 43 is formed by a plate-shaped member being made by metal, e.g. copper. The plate-shaped member is held by a grommet 44 made by rubber and disposed through the contact point chamber 38 of the switch cover 28 and inside the motor 2 to be extended in the radial direction. Specifically, as shown in FIG. 1, one end side of the plate-shaped member protruded from the grommet 44 is inserted to the contact point chamber 38 from the side surface of the switch cover 28 and the other end side of the plate-shaped member protruded from the grommet 44 is inserted into the motor 2 and then, the M terminal 43 is electrically connected to the brush 13 of the positive terminal side via a metal plate in the motor 2.

The terminal-50 37 is formed by, e.g., blade terminal having a flat-plate shape. As shown in FIG. 2, only one terminal-50 37 is projected from outside the switch cover 28 and a resin-made connector 45 formed together with the switch cover 28 is disposed around the terminal-50 37. As shown in FIG. 6, a harness connected to the battery 47 via a starter relay 46 is connected to the terminal-50 37 to which power is supplied from the battery 47 when the starter relay 46 is closed. The starter relay 46 is controlled to be closed by the vehicle side ECU 48 when the engine is restarted in response to a restart request of the driver after the idle stop is performed.

The contact unit includes a first switch that intermittently cuts off the current supplied to the motor 2, a suppression resistor 49 connected in series to the first switch to be connected to an activation circuit of the motor 2, a second switch disposed in the activation circuit, bypassing the suppression resistor 49 and a small solenoid 51 (i.e., sub solenoid) that drives regulation member 50 so as to regulate the operation (close operation) of the second switch.

Figure 5:
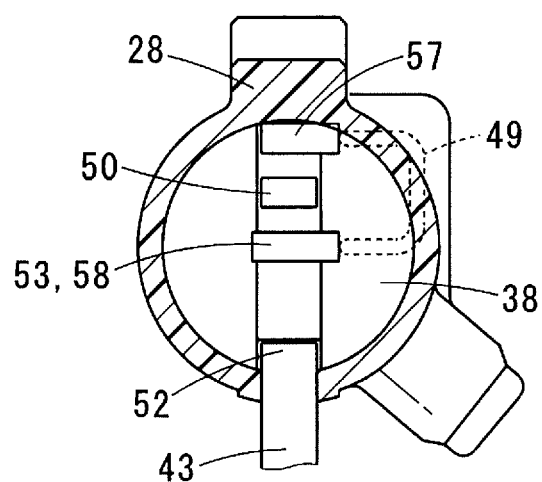
FIG. 5 is a diagram showing a cross-section at a line V-V of the electromagnetic solenoid unit as shown in FIG. 3.

The first switch is constituted by a pair of first fixed contacts 52 and 53, and a first movable contact 54 facing the first fixed contacts 52 and 53 and capable of moving in the axial direction. The first switch is closed when the first movable contact 54 moves towards the first fixed contacts 52 and 53 in the axial direction to come into contact with the pair of first fixed contacts 52 and 53. The first switch is opened while the first movable contact 54 does not contact with the first fixed contacts 52 and 53. In the first fixed contacts 52 and 53, one fixed contact 52 is disposed together with the above-described M terminal 43 to form the M fixed contact of the present disclosure. That is, as shown in FIG. 5, one end side of the M terminal 43 inserted to the contact point chamber 38 from the side surface of the switch cover 28 is formed as the one fixed contact 52. The other fixed contact 53 is fixed to the switch cover 28 with a predetermined distance apart from the one fixed contact 52 so as to form the M intermediate fixed contact of the present disclosure. The other fixed contact point 53 is hereinafter referred to the intermediate fixed contact 53.

The first movable contact 54 is supported by contact support member 55 disposed at one end side of the holding disc 34c included in the plunger rod 34 and movably disposed in the axial direction with respect to the contact support member 55. The first movable contact 54 is urged towards anti-holding member side (right side direction in FIG. 3) by a contact pressure spring 56 disposed between the first movable contact 54 and the holding disc 34c. The contact support member 55 has cylindrical shape, being capable of engaging with the inner periphery of a circular hole (not shown) formed at the holding disc 34c to be slidable on the inner periphery thereof. The contact support member 55 is attached to the holding disc 34c to be movable together with the first movable contact 54 in the axial direction with respect to the holding disc 34c. The contact support member 55 has a flange portion 55a at the frontend portion in the axial direction thereof. The flange portion 55a serves as a stopper to avoid the contact support member 55 slipping off from the circular hole of the holding disc 34c. Meanwhile, at the backend portion in the axial direction of the contact support member 55, a flange portion 55b is disposed. The flange portion 55b serves as a stopper to avoid the first movable contact 54 which is urged by the contact pressure spring 56, slipping off from the contact support member 55.

The suppression resistor 49 suppresses a large amount of current (hereinafter is referred to rush current) from flowing into the motor 2 when the first switch is closed to supply power to the motor 2 from the battery 47. The second switch is constituted by a pair of second fixed contacts 57 and 58, and a second movable contact 59 facing the second fixed contacts 57 and 58 and capable of moving in the axial direction. The second switch is closed when the second movable contact 59 moves towards the second fixed contacts 57 and 58 in the axial direction to come into contact with the pair of second fixed contacts 57 and 58. The second switch is opened while the second movable contact 59 is not contacting with the second fixed contacts 57 and 58. The second switch forms a short circuit path that short-circuits both ends of the suppression resistor 49 when the second movable contact 59 contacts with the second fixed contacts 57 and 58, and releases the short circuit path when the second movable contact 59 moves away from the second fixed contacts 57 and 58.

Among the second fixed contacts 57 and 58, as shown in FIG. 3, the second fixed contact 57 is electrically connected to the B terminal 42 which is fixed to the switch cover 28 so as to form the B fixed contact of the present disclosure. As shown in FIG. 5, the second fixed contact 58 is fixed to the switch cover 28 to have a predetermined interval from the second fixed contact 57, whereby a B intermediate fixed contact of the present disclosure is formed. The fixed contact 58 is hereinafter referred to the intermediate fixed contact 58. The intermediate fixed contact 58 is disposed together with the above-described intermediate fixed contact 53 so as to constitute the common intermediate fixed contact of the present disclosure. The respective contact surfaces of the first fixed contacts 52 and 53 and the second fixed contacts 57 and 58 are disposed corresponding to positions of the first movable point 54 and the second movable contact 59 in the moving direction thereof (axial direction). The one end of the suppression resistor 49 is connected to the one fixed contact 57 and the other end thereof is connected to the intermediate fixed contact 58.

Figure 4:
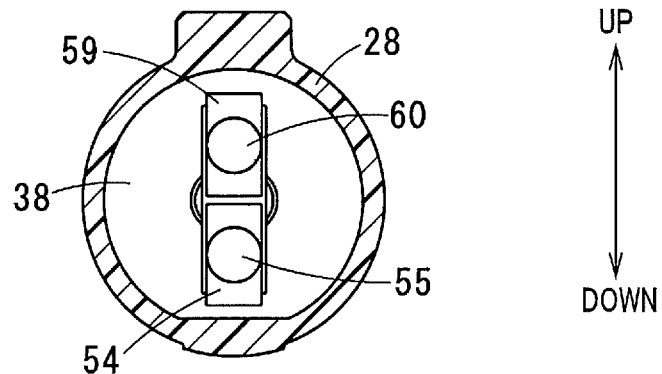
FIG. 4 is a diagram showing a cross-section at a line IV-IV of the electromagnetic solenoid unit as shown in FIG. 3.

The second movable contact 59 is supported by contact support member 60 disposed at the other end face of the holding disc 34c included in the plunger rod 34 and movably disposed in the axial direction with respect to the contact support member 60. The second movable contact 59 is urged towards anti-holding member side (right side direction in FIG. 3) by a contact pressure spring 61 disposed between the second movable contact 59 and the holding disc 34c. Since the configuration of the contact support member 60 is identical to the configuration of the contact support member 55 that supports the first movable contact 54, the detailed explanation thereof is omitted. However, assuming the distance between the first movable contact 54 and the first fixed contacts 52 and 53 is L1, and the distance between the second movable contact 59 and the second fixed contacts 57 and 58 is L2, the relationship L1<L2 is satisfied (FIG. 3). As shown in FIG. 4, the above-described first movable contact 54 and the second movable contact 59 are disposed with a predetermined gap in the longitudinal direction of the contacts (up-down direction as shown in FIG. 4) and supported by the contact support members 55 and 60 respectively. The first movable contact 54 and the second movable contact 59 are disposed together with the contact support members 55 and 60 to be relatively movable in the axial direction with respect to the holding disc 34c.

As shown in FIG. 3, the regulation member 50 is disposed to face the second movable contact 59 in the axial direction. The regulation member 50 is driven to be at a regulated position (described as follows) when the small solenoid 51 operates and returned to the released position while the small solenoid 51 is not operating. The regulated position is a position where movement of the second movable contact 59 is regulated when the second switch is closed, so as to allow the second movable contact 59 to come into contact with the regulation member 50 while there is a gap between the second movable contact 59 and the second fixed contacts 57 and 58, thereby controlling the second movable contact 59 and the second fixed contacts 57 and 58 not to contact each other. Specifically, the regulated position is located between the contact surface of the second movable contact 59 and the contact surface of the second fixed contacts 57 and 58. The released position is a position where the second movable contact 59 and the second fixed contacts 57 and 58 are allowed to contact each other, when the second movable contact 59 is released from the regulated position. Specifically, the released position is located at anti-movable contact side with respect to the contact surface of the second fixed contacts 57 and 58.

As shown in FIG. 6, the small solenoid 51 includes a coil 62 (i.e., sub coil) that forms an electromagnet (hereinafter is referred to sub electromagnet) when the small solenoid 51 is energized and a plunger 63 (i.e., small plunger) that moves towards the axial direction in response to ON/OFF operation of the sub electromagnet. The regulation member 50 operates linking with movement of the plunger 63. It is noted that the ON/OFF operation of the sub electromagnet is identical to the energizing/de-energizing of the coil 62. The small solenoid 51 pulls the plunger 63 to be stuck therewith before the second movable contact 59 comes into contact with the regulation member 50, when the small solenoid 51 forms the sub electromagnet to pull the plunger 63 thereby driving the regulating member 50 to be at the regulated position. While the small solenoid 51 regulates movement of the second movable contact 59, the pressing load of the contact pressure spring 61 that presses the second movable contact 59 is smaller than force that regulates the movement of the second movable contact 59 (i.e., regulation force).

The operating time of the small solenoid 51 (i.e., ON-OFF operations of the sub electromagnet) is controlled by an IC 64 included in the electromagnetic solenoid 8. As shown in FIG. 3, the IC 64 is disposed at anti-movable contact side in the axial direction with respect to the plate-shaped fixed contact 52 which is inserted into the contact point chamber 38 from the side surface of the switch cover 28. In the electromagnetic solenoid 8, when the above-described starter relay 46 is closed, power is supplied to the terminal-50 37 from the battery 47 and then, the main solenoid 26, the small solenoid 51 and the IC 64 are powered via the terminal-50 37. That is, the wiring from the single terminal, i.e., the terminal-50 37 is led (branched) to the main solenoid 26, the small solenoid 51 and the IC 64 inside the switch cover 28. It is noted that the IC 64 corresponds to the control circuit.

Next, the operation of the starter is now described as follows. Hereinafter is described the operation of the starter 1 when the engine is restarted in response to the restart request of the driver after the engine is automatically stopped during the idle stop operation. The ECU 48 controls the starter relay 46 to be closed when the engine restart request is received. When the starter relay 46 is closed, power is supplied to the terminal-50 37 from the battery 47 so as to distribute the power to the main solenoid 26, the small solenoid 51 and the IC 64. Regarding the main solenoid 26, when the main electromagnet is formed by energizing the coil 29, the plunger 33 pushes the return spring 35 to be compressed and being pulled by the fixed iron core 31 whereby the plunger 33 is moved.

When the plunger 33 is moved, the pinion 6 is pushed out towards the anti-motor direction (towards left side in FIG. 1) on the output shaft 4 by the shift lever 25. Then, the end face in the axial direction of the pinion 6 comes into contact with the end face in the axial direction of the ring gear 24 and movement of the pinion 6 is stopped. It is possible that the pinion 6 engages with the ring gear 24 smoothly without coming into contact each other, however, this engaging is unlikely to happen. Usually, the end face of the pinion 6 comes into contact with the end face of the ring gear 24.

When the plunger rod 34 is pushed out towards the direction where the plunger 33 moves, the pinion 6 comes into contact with the ring gear, at almost the same time, the first movable contact 54 comes into contact with the first fixed contacts 52 and 53 so that the first switch is closed by being urged by the contact pressure spring 56.

Figure 7:
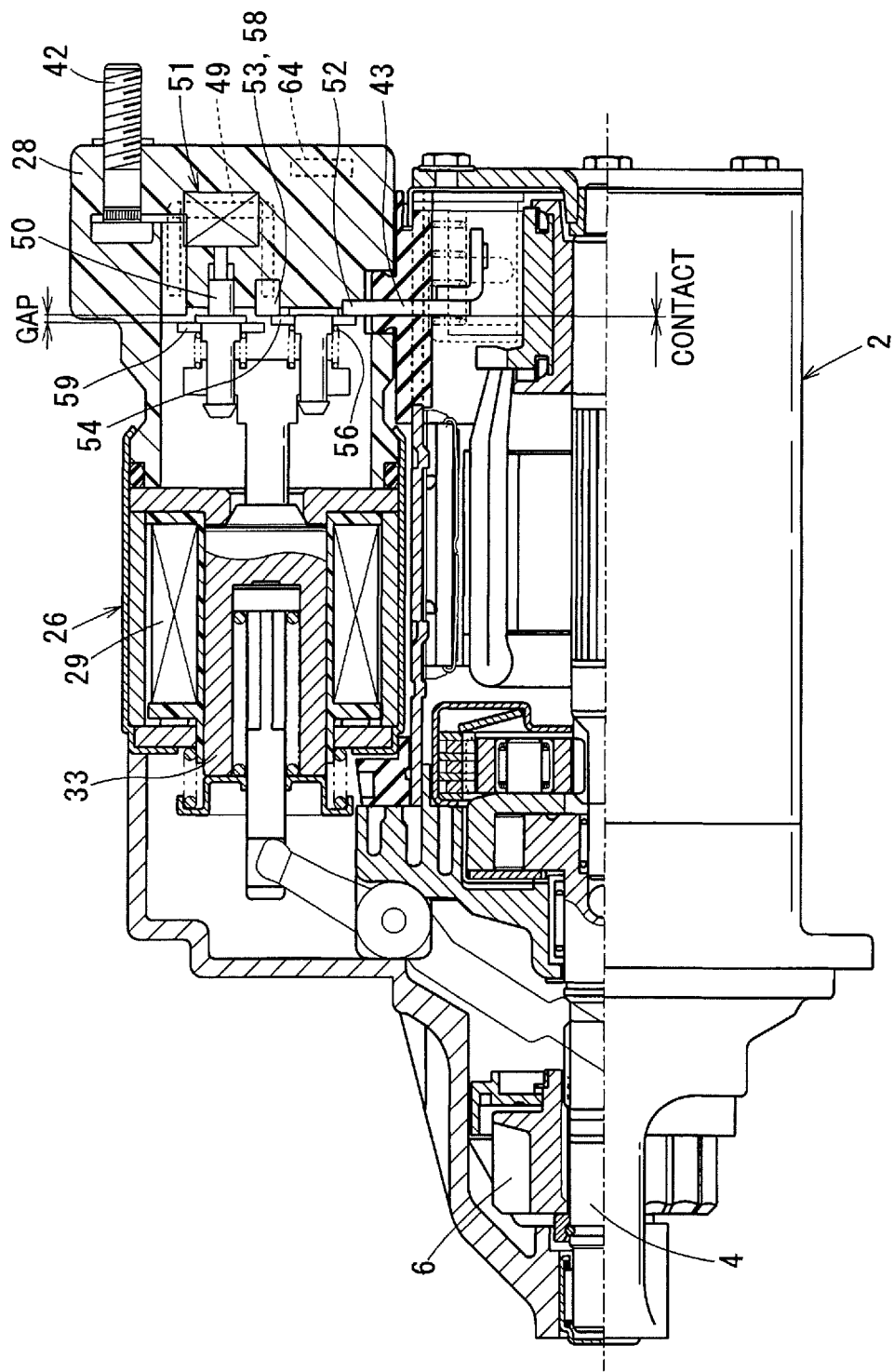
FIG. 7 is a diagram showing a half cross-section of the starter in a state where movement of the second movable contact are regulated before the second switch is closed in response to activation of the main solenoid.
Figure 8:
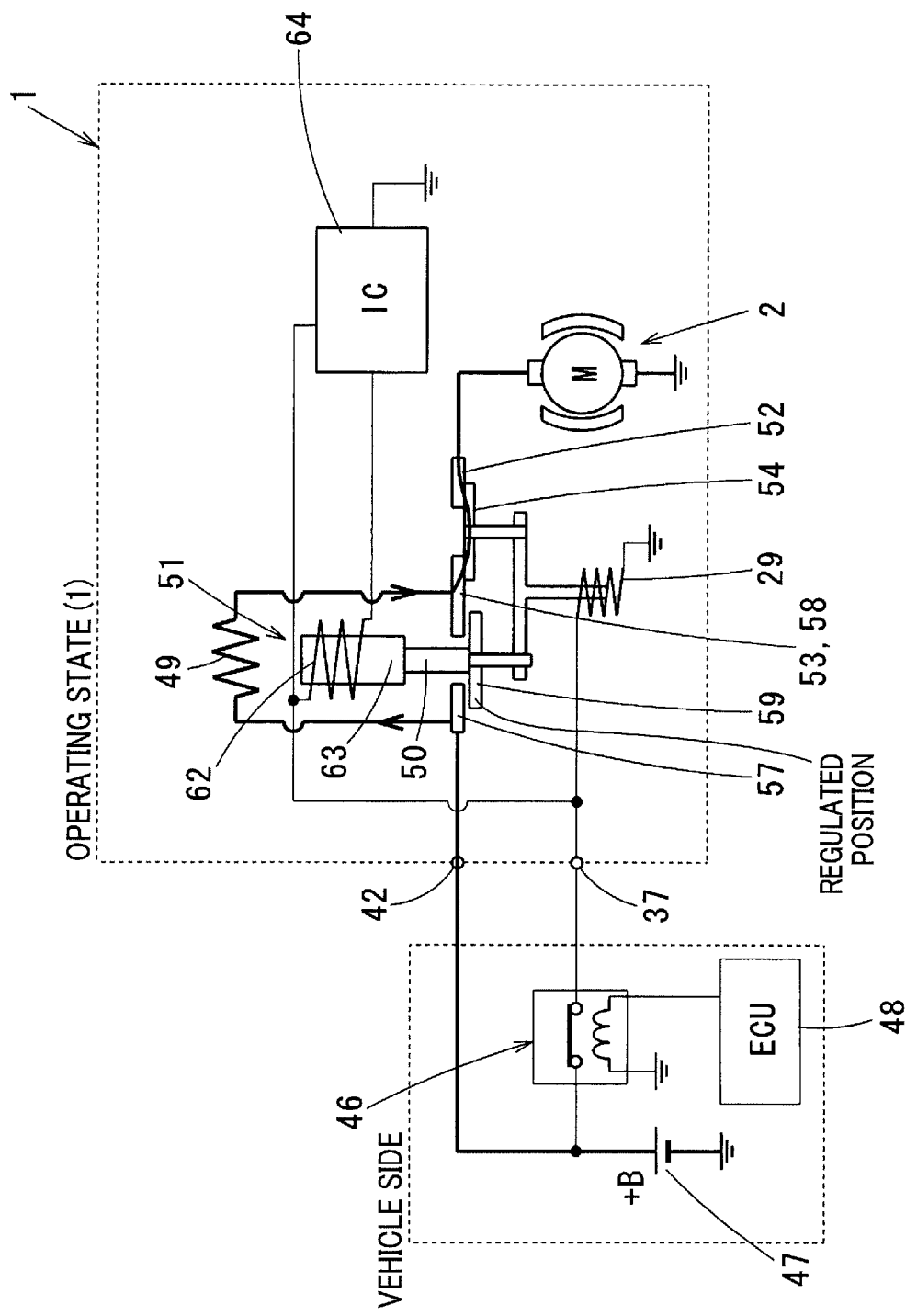
FIG. 8 is a circuit diagram corresponding to the starter as shown in FIG. 7.

Regarding the second switch, when the main solenoid 26 starts to operate and before the second switch is not closed, the small solenoid 51 drives the regulation member 50 to be at the regulated position whereby movement of the second movable contact 59 is regulated. In other words, as shown in FIG. 7, the second movable contact 59 together with the contact support member 60 moves in the axial direction against the holding disc 34c. Then, due to this movement, the contact pressure spring 61 is compressed so as to make a gap between the second movable contact 59 and the second fixed contacts 57 and 58 and the gap is kept while the contact pressure spring is compressed. Hence, when the first switch is closed, a high resistive circuit path including the suppression resistor 49 is formed in the activation circuit of the motor 2. As a result, as shown in FIG. 8, since current flows through the suppression resistor 49 from the battery 47, suppressed current flows into the motor 2 so that the terminal voltage of the battery 47 can be avoided from suffering significant voltage drop. Also, when the motor 2 rotates at lower rotational speed with the suppressed current and the rotational force is transmitted to the pinion 6, the pinion 6 rotates to be at a position where the pinion 6 can be engaged with the ring gear 24, i.e., a position where a tooth of either pinion or ring gear reaches a gap between two teeth (inter-teeth gap) of ring gear or pinion and the one tooth comes into the inter-teeth gap, whereby the pinion engages with the ring gear 24.

Figure 9:
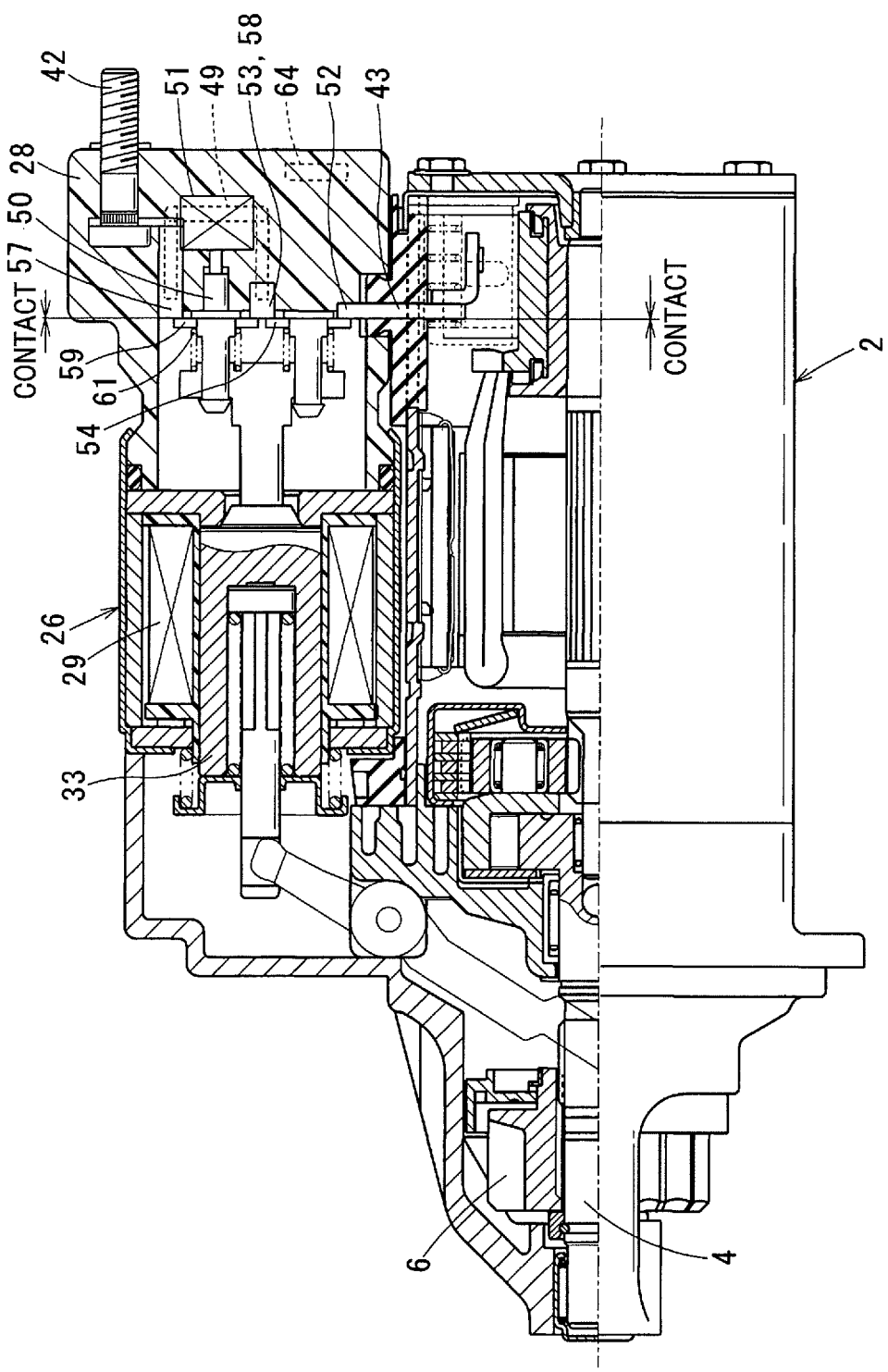
FIG. 9 is a diagram showing a half cross-section of the starter in a state where regulation of the movement of the second movable contact is released when the plunger of the main solenoid is suctioned.
Figure 10:
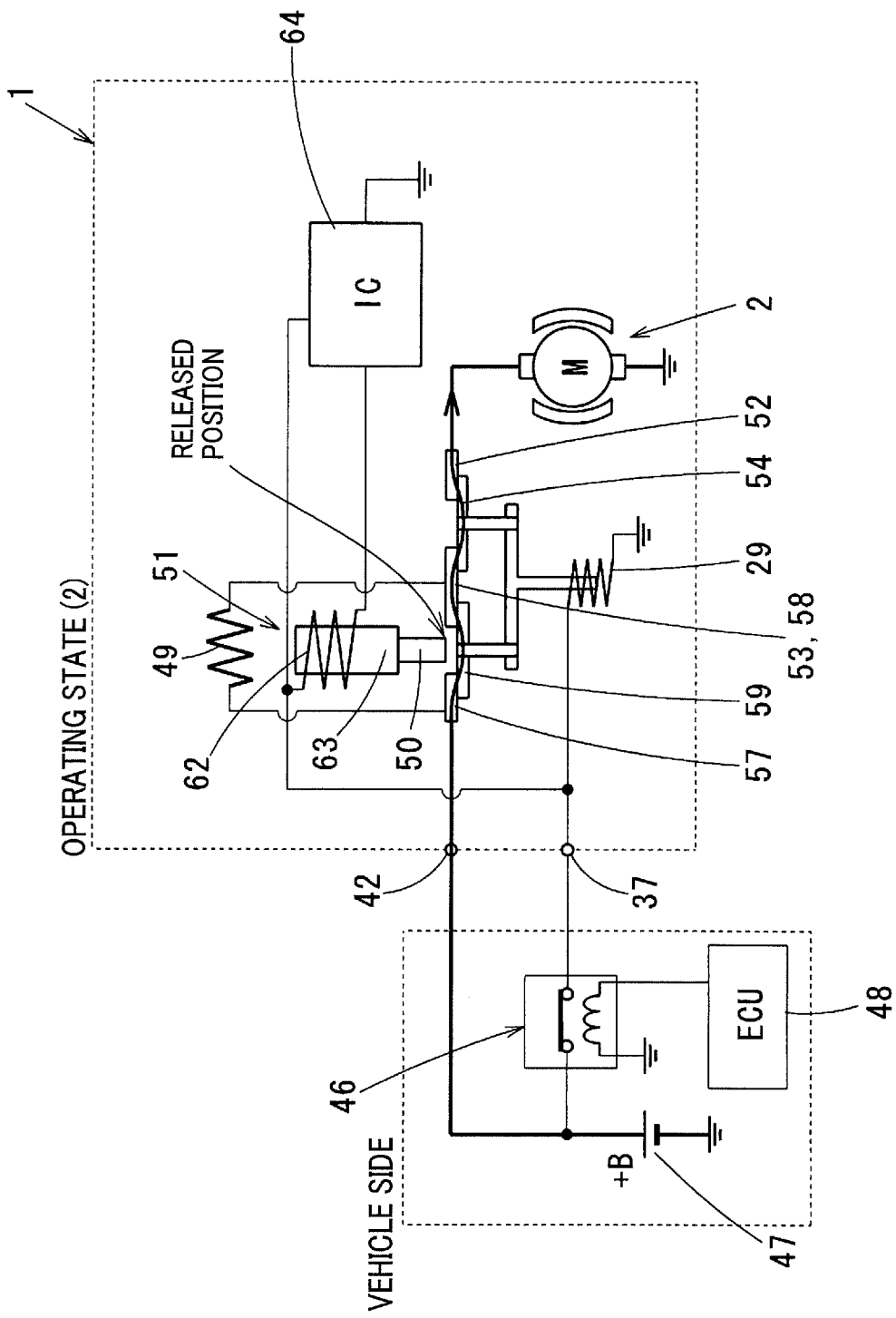
FIG. 10 is a circuit diagram corresponding to the starter as shown in FIG. 9.

Regarding the first solenoid 51, when the plunger 33 of the main solenoid 26 is pulled to the fixed iron core 31 and a predetermined time (e.g., more than approx. 10 millisecond and up to approx. 200 milliseconds) elapses, the coil 62 is de-energized to turn OFF the sub electromagnet. When the small solenoid 51 stops the operation, the plunger 63 is pushed back by reaction force of the return spring (not shown) to allow the regulation member 50 to return to the released position, thereby releasing the second movable contact 59 from the regulated position. As a result, as shown in FIG. 9, the second movable contact 59 comes into contact with the second fixed contacts 57 and 58 and then, by being urged by the contact pressure spring 61, the second switch is closed. Thus, a short circuit path that short-circuits both end of the suppression resistor 49 is formed. Therefore, as shown in FIG. 10, the current is supplied to the motor 2 without the current flowing through the suppression resistor 49. In other words, whole battery voltage of the battery 47 is applied to the motor 2 to make the motor 2 rotate with higher rotational speed, whereby the engine is cranked by the rotational force of the motor 2 being transmitted to the ring gear 24 from the pinion 6.

Effects and Advantages According to the First Embodiment

The electromagnet solenoid unit 8 according to the first embodiment integrates a rush current suppression function that suppresses rush current flowing into the motor 2 when the first switch is closed. Specifically, when the main solenoid 26 starts to operate, however, the second switch is still not closed, the small solenoid operates to regulate the second movable contact 59, whereby the high resistive circuit path is formed in the activation circuit of the motor 2. Accordingly, suppressed current flows into the motor 2 from the battery 47 via the suppression resistor 49 when the first switch is closed. In other words, rush current is suppressed so that significant voltage drop of the battery can be avoided.

Moreover, when the small solenoid 51 stops operation so that the regulation member 50 returns to the released position to release the second movable contact 59 from the regulated position, the motor 2 rotates with higher rotational speed whereby the rotational force of the motor 2 can be transmitted to the ring gear 24 from the pinion 6 being engaged with the ring gear 24. Thus, a timing at which the small solenoid starts to operate and a timing at which the small solenoid stops operation can be appropriately determined so that an amount of current flowing into the motor 2 can be controlled. Regarding the small solenoid 51 integrated in the electromagnetic solenoid unit 8, since the operating time of the small solenoid 51 required for the regulation member 50 being released from the regulated position after driving the regulation member 50 to be at the regulated position is short (e.g., more than approx. 10 millisecond and up to approx. 200 milliseconds), compared to solenoids (SL1, SL2) which used for conventional ISS switch, heat generated by the small solenoid being energized can be significantly reduced. As a result, it is not necessary to secure heat resistant property similar to that of the conventionally used solenoids SL1 and SL2 so that the both solenoids 50 and 60 can be shrunk.

Regarding the small solenoid 51, when the regulation member 50 is driven to be at the regulated position thereby regulating the movements of the second movable contact 59, a movement of the plunger itself of the main solenoid 26 is not regulated. Therefore, regulation force of the small solenoid 51 required for regulating the second movable contact 59 do not necessarily exceed the force of the main electromagnetic solenoid being applied to the plunger 33, whereby the small solenoid can be shrunk. The regulation force of the small solenoid 51 that regulates the movement of the second movable contact 59 may be set larger than the pressing load of the contact pressure spring 61 which presses the second movable contact 59. In other words, since the regulation force of the small solenoid 51 only requires an amount of force slightly larger than the pressing load of the contact pressure spring 61, the size of the small solenoid 51 can be shrunk.

While the small solenoid 51 is operating, the movement of the second movable contact 59 is regulated and the second switch is opened. That is, rush current flowing into the motor 2 when the first switch is closed can be significantly reduced so that influence of the voltage drop caused by the rush current is minimized. As a result, the second solenoid 60 can be further shrunk. Further, the small solenoid 51 is configured when it is operating such that the sub electromagnet is formed so that the plunger 63 is pushed out to drive the regulation member 50 to be at the regulated position. For this reason, assuming the small solenoid 51 is in a fault condition (i.e., the small solenoid 51 cannot operate even when the power is supplied thereto), the first regulation member 50 is not driven to the regulated position. In this case, the electromagnetic solenoid 8 can operate as similar to the non-ISS switch. Therefore, even when the small solenoid 51 has a fault, the fault does not immediately cause a malfunction of the starter operation. As a result, robustness of the electromagnetic solenoid 8 can be enhanced and also, small sized and light weight electromagnetic solenoid 8 can be constituted.

Further, the small solenoid 51 is constituted such that when the small solenoid 51 pulls the plunger 63 so as to drive the regulation member 50 to be at the regulated position, the small solenoid 51 pulls the plunger 63 before the second movable contact 59 comes into contact with the regulation member 50 (i.e., the plunger 63 is pulled to be contacted with the fixed iron core (not shown)).

With these configurations, in the small solenoid 51, an amount of regulation force required for regulating the second movable contact 59 by driving the regulation member 50 to be at the regulated position can be smaller. Specifically, required regulation force of the small solenoid 51 to regulate the second movable contact 59 can be obtained by attraction of the plunger 63 not the attraction of the sub electromagnet that pulls the plunger 63 so that the small solenoid 51 can be shrunk.

Moreover, regarding the first switch and the second switch, the distance between the contact points of the second switch (i.e., distance between the second fixed contacts 57, 58 and the second movable contact 59) is larger than that of the first switch (i.e., distance between the first fixed contacts 52, 53 and the first movable contact 54). Specifically, the contact surface of the first fixed contacts 52 and 53 and the contact surface of the second fixed contacts 57 and 58 is disposed at the same position with respect to the direction along which the first movable contact 54 and the second movable contact 59 move and, while the coil 29 of the main solenoid 26 is not energized, the contact surface of the first movable contact point 54 is disposed to be fixed contact side against the contact surface of the second movable contact 59. Thus, the distance L2 between the second movable contact 59 and the second fixed contact 57 and 58 is set to be larger than the distance L1 between the first movable contact 54 and the first fixed contact 52 and 53 (L1<L2).

According to the above-described configuration of the contact points, when the operation of the starter 1 is stopped, i.e., the starter relay 46 is opened, the first switch is opened before the second switch is opened. Thus, when the first movable contact 54 moves apart from the first fixed contacts 52 and 53, the first switch cut offs only low amount of current that has been flowing into the motor 2 via the suppression resistor 49. Therefore, compared to a case where the whole current flowing into the motor 2 without the suppression resistor 49 is cut off, stress applied to the first switch can be reduced. As a result, durability of the contact point at the first switch 1 can be significantly enhanced. Since the durability of the contact point is enhanced, the size of the first movable contact 54 and the first fixed contact 52 and 53 can be shrunk so that the size of the electromagnetic solenoid 8 can be shrunk as well.

Also, since the first switch and the second switch include both intermediate fixed contacts 53 and 58 to be integrated each other, a structure that connects the intermediate fixed contact 53 and the intermediate fixed contact 58 is not necessary. Therefore, the contact point chamber 38 of the switch cover 28 can be shrunk so that the size of the electromagnet solenoid 8 can be shrunk as well. In the electromagnetic solenoid 8 according to the first embodiment, a battery harness having large heat capacity is connected to the B terminal being fixed to the switch cover 28. In this case, when the ambient temperature is decreased, the temperature of the harness is decreased before the temperature of the starter body is decreased so that the temperature of the B terminal 42 that connects the harness is decreased first. Accordingly, condensation is likely to occur at the surface of the fixed contact 57 being connected to the B terminal 42 in the contact point chamber 38, thereby causing a conduction failure if the condensation is frozen. In this respect, according to the conventional ISS switch, the attraction of the solenoid is required to be larger so as to make a large impact when the movable contact comes into contact with the fixed contact, thereby crushing any ice on the fixed contact.

In contrast, in the configuration of the first embodiment, both ends of the suppression resistor 49 are connected to the fixed contact 57 and 58. In other words, since the suppression resistor 49 having lower thermal conductivity is connected between the fixed contact 57 and the intermediate contact 58, compared to the fixed contact 57 connected to the B terminal 42, it is difficult to cool the intermediate fixed contact 58 immediately. As a result, even when the ambient temperature is decreased, condensation is unlikely to occur at the surface of the intermediate fixed contact 58 so that freezing of the condensation is unlikely to occur as well. Assuming the surface of the fixed contact 57 is frozen, causing a temporally conduction failure, since the first switch is closed to allow current to flow through the suppression resistor 49 thereby generating heat at the suppression resistor 49, the generated heat can melt the ice. Hence, electrical conduction can be secured in the electromagnetic solenoid. Therefore, an amount of attraction of the main solenoid 26 to crush the ice on the contact surface can be reduced so that the size of the electromagnetic solenoid 8 can be further shrunk.

Further, the electromagnetic solenoid 8 does not need to control the main solenoid 26 and the small solenoid 51 individually so that the terminal-50 37 is not necessary to have two terminals like the ISS switch. In other words, the terminal-50 37 can be one terminal like the non-ISS switch so that the electrical wiring from the terminal-50 37 can be branched to connect the main solenoid 26, the small solenoid 51 and the IC 64, whereby the vehicle side harness and the starter relay 46 are not necessarily separated to have 2 different systems, so that the electromagnetic solenoid 8 can be constituted by, as similar to the non-ISS switch, a pair of harness and the starter relay 46. Hence, the ISS system can be constituted with low cost. Furthermore, since the terminal-50 37 is configured as one terminal, the shape of the connector 45 of the terminal-50 37 can be the same shape of the non-ISS switch, whereby the connector 45 does not become larger like the ISS switch so that the mountability thereof can be enhanced.

Since the starter 1 according to the first embodiment integrates the IC 64 that controls an operation time of the small solenoid 51, the operation timing of the second switch is not necessarily controlled from vehicle side so that the second switch can be controlled by the starter 1. In this case, the control in the vehicle side can be accomplished as same as the control of the starter 1 having non-ISS switch. Therefore, the control of the ISS system can be simplified. Since a function in the conventional ICR relay (a function to suppresses rush current flowing into the motor 2) is integrated to the electromagnet solenoid 8, a harness that connects the starter 1 and the ICR relay is not necessary so that voltage drop at the harness (resistor-loss of the harness) becomes zero. As a result, compared to a case where the ICR relay and the starter 1 are combined, the output capability of the starter 1 can be enhanced. Moreover, compared to a case where the ICR relay is disposed in the activation circuit of the motor 2 other than in the electromagnet solenoid 8, the number of components is reduced so that system cost can be reduced. Furthermore, an area for mounting the ICR relay is not necessary so that the mountability of the starter 1 can be improved.

According to the electromagnetic solenoid unit 8 of the first embodiment, the M terminal 43 is formed by a plate-shaped member being made of metal, one end side of the plate-shape member is inserted to the contact point chamber 38 from the side surface of the switch cover 28 and the other end side of the plate-shape member is inserted inside the motor 2 and then, the M terminal 43 is electrically connected to the brush 13 of the positive terminal side. In this case, compared to a case where the M terminal 43 has a bolt-shape as similar to the B terminal 42, at a position where the bolt-shape M terminal 43 is disposed to be penetrated into the switch cover 28 in the axial direction, a space for the IC 64 being mounted can be secured. As a result, necessary components can be effectively arranged inside the switch cover 28, thereby contributing shrinking the electromagnetic solenoid 8.

Hereinafter is described other embodiments of the present disclosure, i.e., embodiments 2 and 3.

It is noted that the same components used in the first embodiment to be shared in the embodiments 2 and 3 are applied with the same reference numbers of the first embodiment, and the explanation thereof is omitted.

Second Embodiment

Figure 11:
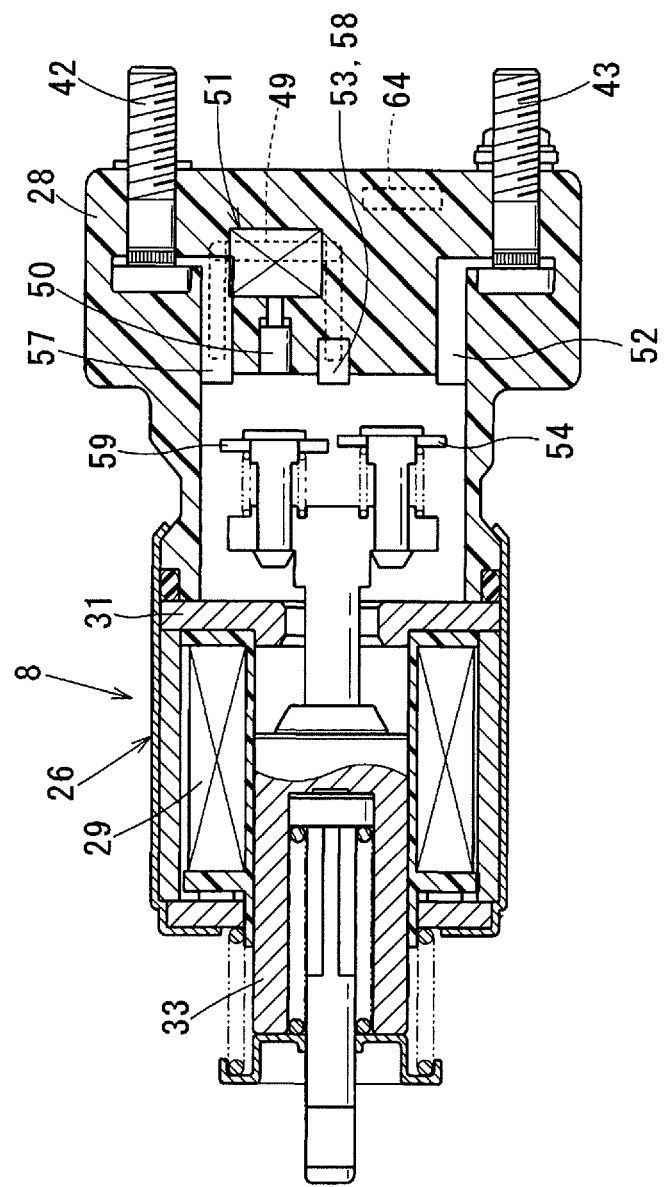
FIG. 11 is a diagram showing a cross section of the electromagnetic solenoid unit according to the second embodiment.

According to the second embodiment, as shown in FIG. 11, the M terminal 43 has a bolt-shape similar to that of the B terminal 42 described in the first embodiment. In this case, regarding the small solenoid 51, the negative terminal side of the coil 62 can readily be connected to the M terminal 43 inside the switch cover 28 and can be connected to the ground (earth) from the M terminal 43 via the motor 2.

The IC 64 that controls the operating time of the small solenoid 51 is connected in series to the operation circuit of the small solenoid 51. In other words, the IC 64 is connected between the small solenoid 51 and the ground, or connected between the terminal-50 37 and the small solenoid 51.

Regarding the M terminal 43 having bolt-shape according to the second embodiment, as similar to that of the conventional ISS switch or the non-ISS switch, a terminal of the motor lead (not shown) is connected to the male screw portion protruded from the backend of the switch cover 28 in the axial direction. The anti-terminal side of the motor lead is inserted inside the motor 2 penetrating the grommet made of rubber and electrically connected to the positive terminal side of the brush 13. Regarding the electromagnetic solenoid 8 according to the second embodiment, since the small solenoid 51 can be connected inside the switch cover 28, the structure of the electromagnetic solenoid 8 can be
simple and the switch cover 28 can be fixed to the main solenoid 26 easily.

Third Embodiment

According to the third embodiment, a structure is exemplified of the starter 1 in which the small solenoid 51 is connected to the M terminal 43 as similar to that of the second embodiment, and having longer operating life as similar to that of the brush 13. The starter 1 that uses the commutator motor 2 cannot accurately detect the operating life of the brush 13. Hence, the number of operating times is counted in the vehicle side and the ECU 48 prompts the user to exchange the starter 1 when the number of operating times reaches a predetermined value (life time operating count). In this case, since the brush 13 is designed to have enough margin in its operating life to meet the estimated operating life (i.e., not less than estimated operating times) of the starter 1, the brush 13 cannot be used effectively until around the operating life thereof.

Figure 12:
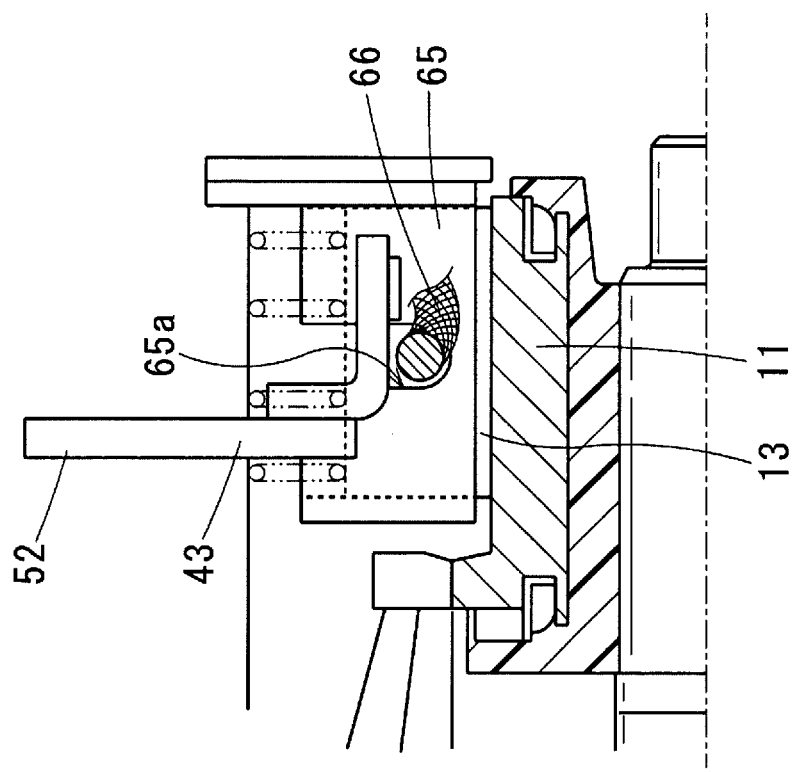
FIG. 12 is a diagram showing a cross-section that indicates a structure of vicinity of the brush according to the third embodiment.

Meanwhile, when the brush 13 wears to reach around the operating life, a contact pressure between the commutator 11 and the brush 13 is decreased so that the contact resistance rapidly increases, thereby degrading the performance of the motor 2. However, since the starter 1 is usually designed to utilize the maximum output power at low temperature, the starter 1 has enough capability at the normal temperature to achieve required performance for restarting the engine. Therefore, even when the brush 13 wears and suffers degraded the performance near the end of its operating life, the starter 1 still can start the engine. Accordingly, the starter 1 of the third embodiment is designed to have a configuration such that contact between the commutator 11 and the brush 13 becomes unstable before the motor 2 is not able to restart the engine due to wear of brush 13 reaching the operating life. Specifically, as shown in FIG. 12, a hooking between a brush holder 65 that holds the brush 13 and a brush pigtail 66 can be employed. In other words, an U-shape groove 65a used for picking the brush pigtail 66 up is formed at the side surface of the brush holder 65. When the brush 13 is worn near the end of the operating life, the brush pigtail 66 is hooked at a bottom portion of the U-shape groove 65a.

Here, regarding the small solenoid 51, the negative side of the coil 62 is connected to the M terminal 43 and connected to the ground via the motor 2 so that the small solenoid 51 cannot operate properly when the contact between the commutator 11 and the brush 13 becomes unstable. In other words, when the contact between the commutator 11 and the brush 13 become unstable, the small solenoid 51 cannot obtain required regulation force to regulate the second movable contact 59 because the drive voltage applied to the coil 62 is decreased. As a result, the movement of the second movable contact 59 is not regulated, therefore, a time difference between a timing at which the first switch is closed and a timing at which the second switch is closed becomes zero. That is, since the first switch and the second switch close at almost the same timing, a voltage drop caused by rush current, in response to contacts of the first and second switches coming into contact to close the respective switches, occurs only once.

In this case, a malfunction of the starter operation does not occur, however, the battery voltage decreases to a voltage range which inhibits an operation of the ISS so that the ISS is unlikely to operate. Therefore, the ECU 48 in the vehicle side detects the number of occurrences of the voltage drop due to rush current so as to determine that the small solenoid 51 has not operated properly when the ECU 48 detects the voltage drop due to the rush current has occurred only once, that is, when the ECU 48 does not detect the second voltage drop. The ECU 48 is able to notify the driver that a fault has occurred at the small solenoid 51. Accordingly, even when the brush 13 wears to reach the operating life, the driver is notified that the starter 1 needs to be replaced before the starter 1 becomes totally broken where the starter 1 is unable to start the engine at all. As a result, since the starter 1 can be effectively used until around the operating life thereof, the operating life of the brush 13 can be designed to have less margin value whereby the size of the starter 1 can be shrunk and the weight of the starter 1 can be lighter.

The above-described case is a case that the small solenoid 51 cannot regulate the movement of the second movable contact 59 because the contact between commutator 11 and the brush 13 becomes unstable. In other words, it is assumed that a fault does not occur in the small solenoid 51, however, the drive voltage applied to the coil 62 decreases so that necessary regulation force to regulate the second movable contact cannot be obtained. In this respect, when a fault occurs at the small solenoid 51 itself to cause an operation failure, for example, when the coil does not work even if the coil 62 is energized, time difference between a timing at which the first switch is closed and a timing at which the second switch is closed becomes zero. Hence, similarly to that of the above-described case, the ECU 48 detects the number of occurrence of the voltage drop due to rush current and determines that the small solenoid 51 does not work properly when the ECU 48 does not detect the second voltage drop.

Moreover, the ECU 48 can be configured to determine, when the second voltage drop cannot be detected, whether the contact between the commutator 11 and the brush 13 has become unstable due to wear of the brush 13 or the small solenoid 51 has a fault. For example, when the operation time of the starter 1 does not reach a predetermined number, the ECU 48 can determine that some fault has occurred at the small solenoid 51 and determine contact between the commutator 11 and the brush 13 has not become unstable.

(Modification)

According to the first embodiment, the first switch is disposed at the motor 2 side with respect to the second switch. However, the first switch can be disposed at battery 47 side with respect to the second switch. Moreover, according to the first embodiment, the intermediate fixed contact 53 at the first switch side and the intermediate fixed contact 58 at the second switch are integrated, however, both intermediate fixed contacts 53 and 58 can be formed individually and can be electrically connected with a metal plate. According to the second and third embodiments, negative side of the coil 62 of the small solenoid 51 is connected to the M terminal 43 having bolt-shape, however, the negative side of the coil 62 can be connected to the M terminal 43 as described in the first embodiment, i.e., plate-like member made of metal. In other words, even the M terminal 43 is a plate-like member, a lock portion can be disposed in the electromagnet solenoid 8 so as to have the negative side of the coil 62 readily connected to the M terminal 43.

What is claimed is:

1. A starter for starting an engine mounted on a vehicle, comprising:
    a motor that generates rotational force by being energized, the motor rotating about a rotational axis thereof;
    a pinion that transmits the rotational force of the motor to a ring gear of the engine when the pinion engages with the ring gear; and
    an electromagnetic solenoid fixed to a starter housing to be in parallel with the motor such that the rotational axis of the motor and an axial direction being a longitudinal direction of the electromagnetic solenoid are parallel, wherein
    the electromagnetic solenoid includes:
        a pair of first fixed contacts disposed at an activation circuit of the motor;
        a first movable contact facing the pair of first fixed contacts, being movable in the axial direction to open and close the pair of first fixed contacts, the pair of first fixed contacts being closed when the first movable contact contacts with the pair of first fixed contacts and the first fixed contacts being opened when the first movable contact is separated from the pair of first fixed contacts;
        a first switch that intermittently cuts off a current supplied to the motor in response to the first movable contact opening and closing the pair of first fixed contacts, the first switch being opened when the first movable contact opens the pair of first fixed contacts and being closed when the first movable contact closes the pair of first fixed contacts;
        a suppression resistor connected to the activation circuit to be in series to the first switch, suppressing rush current flowing into the activation circuit when the first switch is closed;
        a pair of second fixed contacts disposed at the activation circuit, bypassing the suppression resistor;
        a second movable contact facing the pair of second fixed contacts, being movable in the axial direction to open and close the pair of second fixed contacts, the pair of second fixed contacts being closed when the second movable contact contacts with the pair of second fixed contacts and the pair of second fixed contacts being opened when the second movable contact is separated from the pair of second fixed contacts;
        a second switch that short-circuits the suppression resistor to make a short circuit path when the second movable contact closes the pair of second fixed contacts, the second switch releasing the short circuit path when the second movable contact opens the pair of second fixed contacts, the second switch being opened when the second movable contact opens the pair of second fixed contacts and being closed when the second movable contact closes the pair of second fixed contacts;
        a main solenoid including a main electromagnet when being energized and a plunger being pulled by the main electromagnet to move in the axial direction, wherein the main solenoid pushes the pinion out towards the ring gear in response to the plunger moving in the axial direction and drives the first movable contact and the second movable contact towards the pair of first fixed contacts and the pair of second fixed contacts respectively;
        a regulation member disposed to be movable between a regulated position and a released position, the regulated position regulating movement of the second movable contact not to contact with the pair of second fixed contacts when the second switch is being closed, the released position releasing movement of the second movable contact so as to allow the second movable contact to contact with the pair of second fixed contacts; and
        a sub solenoid forming a sub electromagnet when being energized, driving the regulation member to be at the regulated position when the sub electromagnet is ON and releasing the regulation member to be at the released position when the sub electromagnet is OFF, wherein
    the sub solenoid is configured to control the sub electromagnet to be ON and OFF such that the regulation member is driven to be at the regulated position before the second switch is closed when the main solenoid starts to operate, so as to regulate the movement of the second movable contact and the regulation member is released to be at the released position when a predetermined time elapses after the plunger is pulled by the main electromagnet, so as to release the movement of the second movable contact.

2. The starter according to claim 1, wherein
    the sub solenoid includes a small plunger being pulled by the sub electromagnet thereby allowing the small plunger to move in the axial direction;
    the regulation member is disposed to be movable together with the small plunger between the regulated position and the released position; and
    the small plunger is pulled by the sub electromagnet before the second movable contact contacts with the regulation member, when the regulation member is driven to be at the regulated position.

3. The starter according to claim 1, wherein
    the first switch and the second switch is configured such that when the first moveable contact and the second movable contact are separated from the pair of first fixed contacts and the pair of second fixed contacts respectively in response to an operation stop of the main solenoid, the second movable contact is separated from the pair of first fixed contacts before the first movable contact is separated from the pair of second fixed contacts.

4. The starter according to claim 1, wherein
    the electromagnetic solenoid includes a frame having a cylindrical shape and serving as a magnetic circuit of the main solenoid and a switch cover that is fixed to the frame to cover an opening of the frame;
    a first connection terminal connected to a battery side of the activation circuit and a second connection terminal connected to a motor side of the activation circuit are fixed to the switch cover;

a B-fixed contact connected to the first connection terminal, an M-fixed contact connected to the second connection terminal, a B-intermediate fixed contact being paired with the B-fixed contact and an M-intermediate fixed contact being paired with the M-fixed contact which are arranged inside the switch cover; and either one of the first fixed contact or the second fixed contact is constituted by the B-fixed contact and the B-intermediate fixed contact and the other one of the first fixed contact or the second fixed contact is constituted by the M-fixed contact and the M-intermediate fixed contact; and the B-intermediate fixed contact and the M-intermediate fixed contact are electrically connected from each other.

5. The starter according to claim 4, wherein
the B-intermediate fixed contact and the M-intermediate fixed contact are integrated to be a common intermediate fixed contact.

6. The starter according to claim 4, wherein
one end of the suppression resistor is connected to the B-fixed contact and the other end of the suppression resistor is connected to the B-intermediate fixed contact or the common intermediate fixed contact.

7. The starter according to claim 1, wherein
the starter includes a control circuit that controls an operating time of the sub solenoid.

8. The starter according to claim 7, wherein
the control circuit is integrated to the electromagnetic solenoid.

9. The starter according to claim 7, wherein
the starter includes a conduction terminal connected to the battery via a harness, the conduction terminal is a single terminal at which the harness is connected, and a wiring from the conduction terminal is branched to connect the main solenoid, the sub solenoid and the control circuit.

10. The starter according to claim 4, wherein
the sub solenoid is disposed inside the switch cover;
the sub solenoid includes a sub coil that forms the sub electromagnet when being energized; and
a negative side of the sub coil is connected to the second connection terminal to be grounded via the motor.

11. The starter according to claim 10, wherein
the motor includes a commutator and a brush, the motor is configured such that contact between the commutator and the brush becomes unstable before the motor loses a required performance for restarting the engine due to wear of the brush sliding on an outer periphery of the commutator; and
the sub solenoid is configured such that a driving voltage applied to the sub coil is decreased when the contact between the commutator and the brush becomes unstable, whereby the sub solenoid cannot obtain required regulation force to regulate the movement of the second movable contact by the regulation member.

12. The starter according to claim 11, wherein
the motor is configured such that a brush pigtail of the brush is hooked at a brush holder that holds the brush before the brush wears to reach an operating life thereof, whereby the contact between the commutator and the brush becomes unstable.

13. The starter according to claim 7, wherein
the second connection terminal is formed by a plate-shaped member being made of metal, one end side of the plate-shape member forms the M-fixed contact inside the switch cover, the other end side of the plate-shape member is protruded in a radial direction being perpendicular to the axial direction from a surface of the switch cover to to be inserted into the motor and electrically connected to the brush inside the motor; and
the control circuit is disposed in the switch cover to be at an anti-movable contact side in the axial direction with respect to the M-fixed contact.

14. An engine starting unit including the starter according to claim 1, wherein
the engine starting unit includes an operation determining unit that determines whether or not the sub solenoid operates properly when the engine is restarted from an idle stop condition; and
the operation determining unit detects an occurrence of a voltage drop caused by a rush current in response to contacts of the first and second switches coming into contact to close the respective switches and, determines that the sub solenoid has operated properly when the operation determining unit detects that the voltage drop occurs twice and determines that the sub solenoid has not operated properly when the operation determining unit does not detect a second voltage drop after occurrence of a first voltage drop.

15. An engine starting unit including the starter according to claim 2, wherein
the engine starting unit includes an operation determining unit that determines whether or not the sub solenoid operates properly when the engine is restarted from an idle stop condition;
the operation determining unit detects an occurrence of a voltage drop caused by a rush current in response to contacts of the first and second switches coming into contact to close the respective switches and, determines that the sub solenoid has operated properly when the operation determining unit detects that the voltage drop occurs twice and determines that the sub solenoid has not operated properly when the operation determining unit does not detect a second voltage drop after occurrence of a first voltage drop.

16. An engine starting unit including the starter according to claim 3, wherein
the engine starting unit includes an operation determining unit that determines whether or not the sub solenoid operates properly when the engine is restarted from an idle stop condition;
the operation determining unit detects an occurrence of a voltage drop caused by a rush current in response to contacts of the first and second switches coming into contact to close the respective switches and, determines that the sub solenoid has operated properly when the operation determining unit detects that the voltage drop occurs twice and determines that the sub solenoid has not operated properly when the operation determining unit does not detect a second voltage drop after occurrence of a first voltage drop.

* * * * *